United States Patent [19]

Chaklader et al.

[11] Patent Number: 5,073,193
[45] Date of Patent: Dec. 17, 1991

[54] METHOD OF COLLECTING PLASMA SYNTHESIZE CERAMIC POWDERS

[75] Inventors: Asoke C. D. Chaklader; Robert G. Butters, both of Vancouver; Douglas A. Ross, Richmond, all of Canada

[73] Assignee: The University of British Columbia, Vancouver, Canada

[21] Appl. No.: 543,402

[22] Filed: Jun. 26, 1990

[51] Int. Cl.$^5$ .......................... B22F 9/14; C23C 15/00
[52] U.S. Cl. .......................................... 75/346; 75/345; 148/20.6
[58] Field of Search .................. 75/346, 345; 148/20.6

[56] References Cited

U.S. PATENT DOCUMENTS

| | | | |
|---|---|---|---|
| 4,289,952 | 9/1981 | Haggerty | 75/345 |
| 4,533,382 | 8/1985 | Miura et al. | 266/200 |
| 4,619,691 | 10/1986 | Araya et al. | 75/345 |
| 4,756,746 | 7/1988 | Kemp, Jr. et al. | 75/346 |
| 4,769,064 | 9/1988 | Buss et al. | 75/345 |
| 4,872,905 | 10/1989 | Bourne et al. | 437/96 |

OTHER PUBLICATIONS

"RF Plasma System for the Production of Ultra-Fine Ultra-Pure Silicon Carbide" Hallbough, Journal of Material Science, vol. 18, 1983, 3190-3194.

"Synthesis of Ultrafine SiC Powders by Laser-Driven Gas Phase Reaction" Suyama et al., Ceramics Bul, vol. 64, vol. 10, 1985.

Produzione di Carburo di Silico-B Poluere Ultrafine per Sintesi di Plasma Ode Pous-Battelle Ceramica Intermacrore, vol. 13, 1978.

*Primary Examiner*—Upendra Roy
*Attorney, Agent, or Firm*—C. A. Rowley

[57] ABSTRACT

A system for producing ceramic or cermet material in a plasma type thermal reactor wherein a reactor flame and reactants are introduced into one end of a reaction chamber through which a concentric film of collecting liquid (oil) flows and empties at the opposite end into a pool of collecting liquid. The collecting (and cooling) liquid enters the chamber at the same end the flame enters and forms a liquid wall surrounding the flame that sweeps substantially the whole inner periphery of the walls of the chamber from one end to the opposite end and empties into the pool of collecting (and cooling) liquid. Liquid from the pool is recirculated back to the one end and is filtered to remove the particulate formed from the reactants.

14 Claims, 6 Drawing Sheets

METHOD OF COLLECTING PLASMA SYNTHESIZE CERAMIC POWDERS

FIELD OF THE INVENTION

The present invention relates to synthesis of ceramic powders in a plasma flame to form ceramic or cermet powers. More particularly the present invention relates to a system for forming and collecting ceramic or cermet powders.

BACKGROUND OF THE PRESENT INVENTION

Many systems for producing ceramic powders have been investigated, for example the sol-gel process, plasma processing and other thermal and chemical routes. The sol-gel process is considered to be an expensive process, and some of the other processes have not been successful at producing powders of the required small size or purity.

Numerous attempts at plasma synthesis of materials, such as silicon carbide powder using both an induction plasma and a DC-arc plasma systems have been made. Sub-micron particles of ultra-pure silicon carbide were synthesized at Los Alamos Laboratory (U.S.A.) (see "RF Plasma System for the Production of Ultra-Fine, Ultra-Pure Silicon Carbide" by C. M. Hallbough, Journal of Material Science, Volume 18, 1983, 3190-94), using an RF plasma for reacting silane with methane. O. de Pours, Battell Geneva Research Centre in Ceramic Informazione Volume 13, No. 143, 1978, 283-92 describes production, from the same reactants, of a silicon carbide powder of a particle size of about 0.5 micron was produced using a commercial dc plasma torch. The product was contaminated by copper and tungsten from the torch anode and cathode respectively.

Ultra fine silicon carbide has also been made by a laser driven reaction of silane and methane (see Y. Suyama and R. M. Hara "Synthesis of Ultra-Fine SiC Powder by Laser Driven Gas Phase Reactions", American Ceramics Society Bulletin, V64, No. 10, 1985, 1356-59).

U.S. Pat. No. 4,533,382 issued Aug. 6, 1985 to Miura et al discloses a system for making a fine metal powder using a heated vaporization chamber and cooling the vapour in an adiabatic expansion nozzle to form the powder which is collected in an oil bath. U.S. Pat. No. 4,872,905 produces a metallic or non-metallic powder by a sputtering technique and captures the particles formed in a high molecular weight low vapour pressure oil. The recovered particles have a molecular layer of oil that tends to prevent agglomeration.

Sub-micron size SiC powders are not widely available commercially and those that are have a wide particle size distribution, e.g. ranging between 4 and 0.2 microns.

BRIEF DESCRIPTION OF THE PRESENT INVENTION

It is an object of the present invention to provide a new system of collecting a ceramic or cermet powder in a collecting liquid.

Broadly the present invention relates to a system for producing ceramic or cermet powder material comprising a flame type thermal reactor having a sealed reaction chamber formed by a sleeve, means for providing a reactor flame at one longitudinal end of said chamber, means for introducing reactants into said flame, means containing a pool of collecting liquid at the other longitudinal end of said chamber, means for introducing said collecting liquid into said chamber adjacent said one end of said sleeve in a manner to encircle said flame and to hug an inner surface of said sleeve through substantially the length of said chamber from said one end to said other end and pass into said pool, means for withdrawing said liquid from said pool and reintroducing it into said chamber at said one end and means for separating particulate material collected by said collecting liquid from said collecting liquid.

Preferably the flame type thermal reactor will be a plasma type reactor.

Preferably said collecting liquid will be cooled before being returned to said one end.

More preferably said sleeve will be substantially circular in cross section and said cooling liquid will be introduced at the one end in a direction to cause it to flow helically down the inside surface of said sleeve and be held against said surface by centrifugal force.

Preferably the longitudinal axis of said sleeve will be substantially vertical.

The present invention also relates to a method of making a ceramic powder using the apparatus of the present invention and to the ceramic powder produced.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
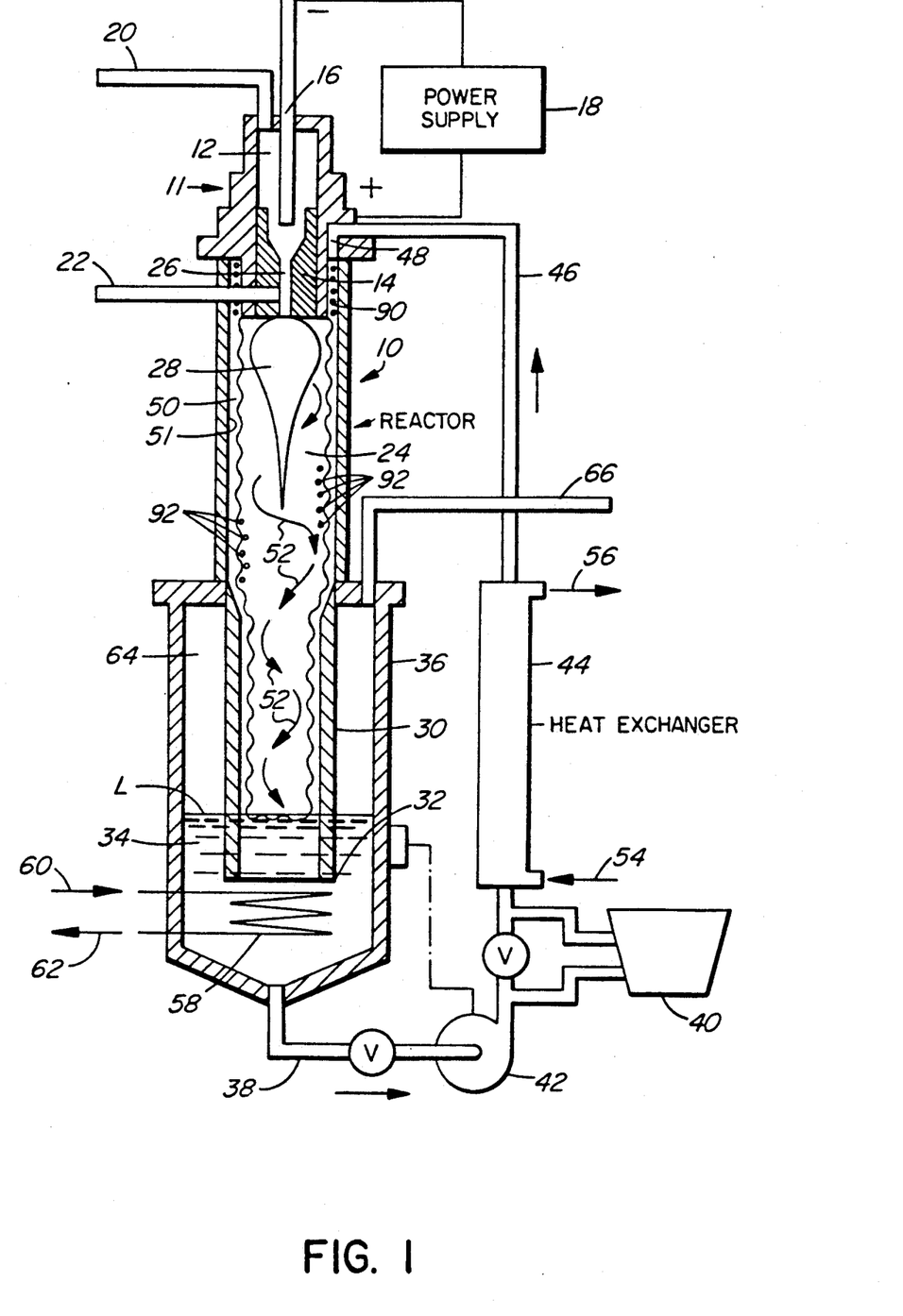
FIG. 1 is a schematic illustration of one form of the present invention.

As shown in FIG. 1 the basic elements of the present invention comprise a flame type thermal reactor 10 which in the illustrated arrangement includes a plasma jet forming torch 11 having a DC-arc chamber 12 incorporating a cathode 14 and anode 16 powered by a power supply 18. A plasma jet is formed in the plasma jet passage 26 through the anode 14 by plasma gases introduced into the chamber 12 via line 20 and ignited in the chamber 12. Reactants are introduced via line 22 in the illustrated arrangement into the passage 26 through the cathode in this case, via line 22. Obviously the reactants may be introduced in other conventional ways.

The plasma jet formed in the passage 26 is injected into a substantially sealed reactor chamber 24 together with the reactants introduced via line 22 and form the reactor flame 28 (plasma flame in the illustrated arrangement) in the chamber 24.

In the arrangement illustrated in FIG. 1, the reactor chamber 24 is formed by a sleeve 30 having two sections, each being substantially cylindrical with the top section 30A being slightly greater in inside diameter than the lower section 30B. The reactor chamber 24, if desired, may have a substantially constant in internal diameter extending its full length i.e. by single sleeve section 30, as shown, for example, in FIG. 5.

Bottom end 32 (other end) of the reacting chamber 24 empties into a pool 34 of oil or other coolant and collecting liquid 34 contained within the well 36.

Cooling and collecting liquid from the pool 34 is removed via line 38, passed through a pump 42, indirect heat exchanger 44 (cooler), pipe 46 and is returned to the top 48 (one end) of the chamber 24 and forms a continuous wall 50 of a film of liquid that flows in hugging relationship down the inside of the chamber 24 to sweep substantially the whole inner surface 51 of the reaction chamber 24 from one end 48 to the other end 34. A filter 40 may selectively be connected between the pump 38 and the heat exchanger 44. The wall 50 of collecting liquid surrounds the plasma flame 28 to contain and entrain any reactants and collect the powder formed. The flow of the liquid on the inner surface 51 cools the sleeve 30 (30A and 30B) forming the chamber 24.

The liquid wall or film 50 sweeping the inner surface 51 of the reactor 24 preferably flows in a substantially helical path as indicated by the arrows 52 which may be induced by a suitable header 78 at the top of the reacting chamber 24 introducing the coolant and collecting liquid against the inner surface 51 and with a substantial tangential component. If the velocity of the liquid on the helical path is sufficiently high the liquid will be held in contact with the wall of the chamber 24 by centrifugal force which permits the longitudinal axis of the chamber 24 to be inclined or even horizontal as long as the liquid remains in contact with the walls to a location beyond the end of the flame remote from the end 48.

The collecting and cooling oil in the illustrated arrangement is cooled by the indirect heat exchanger 44 wherein cooling liquid is circulated as indicated by the arrows 54 and 56 and in a cooling coil 58 in the well 36 and through which cooling liquid is passed as indicated by the arrows 60 and 62.

It will be noted that above the level L of the oil in the well 36, is an annular space 64 surrounding the chamber 24 into which exhaust gases percolate from the oil in the pool 34. These exhaust gases are ejected via the line 66.

Figure 2:
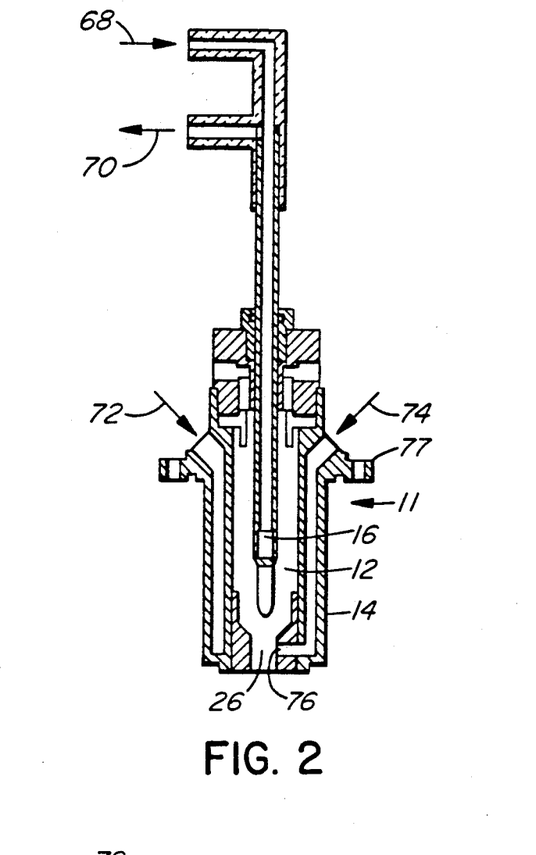
FIG. 2 is a more detailed section of the arc forming section used with the present invention.

The plasma jet forming torch 11 positioned at the top of the reacting chamber 24 is shown in more detail in FIG. 2. As illustrated the cathode 16 is cooled as indicated by the circulating arrows 68 and 70 by a coolant that is also introduced and circulated through the system as indicated at 72 to cool the anode 14. Generally the coolant will be cold water.

Reactant material is introduced into the plasma jet as indicated by the arrows 74 (i.e. from the line 22 not show in FIG. 2) and passes down to anode 14 where it is injected radially into the plasma flame flowing through the jet passage 26 as indicated at 76.

The plasma jet forming torch 11 is provided with mounting flanges 77 for bolting and sealing the plasma jet torch 11 to the top of the inlet manifold 78 for cooling liquids at the top 48 of the chamber 24. The cooling liquid flows down between manifold, inner housing 80 and the inner surface 50 of the chamber 24 and is given a significant tangential velocity so that the liquid spins down the inner surface 50 in a helical flow as described above and as indicated by the arrows 52.

Figure 3:
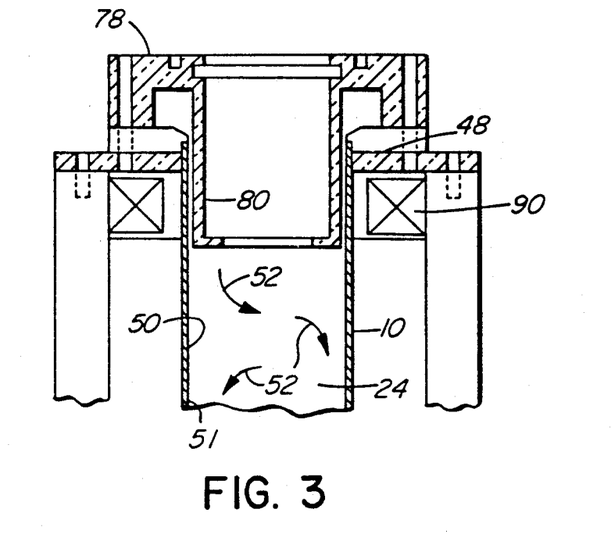
FIG. 3 is a more detailed section of the system for introducing cooling and collecting liquid at the top of the sleeve forming the reacting chamber.

Surrounding the anode 14 is a magnetic coil 90 (see FIGS. 1 and 3) which is used to control a magnetic pattern applied around the nozzle 26 whereby in known manner the plasma flame may be directed as desired eg to cause it to rotate.

In operation an arc is struck between the anode 14 and cathode 16. Plasma gas is fed into the chamber 12 via the line 20. The plasma is generated by the DC-arc formed between the anode 14 and cathode 16 to produce a plasma jet passing through the nozzle 26 and forming the plasma flame 28 within the reactor 24.

The reactants to be reacted to form the powder of the present invention are introduced via line 22 substantially radially into the passage 26 and into the plasma jet formed in the nozzle or passage 26.

The flame 28 may be rotated by controlling the magnetic lines of flux generated by the coil 90.

Cooling and collecting liquid is introduced at the top of the chamber 24 from manifold 78 fed by line 46 and is caused to form a liquid film wall 50 and to flow down the inner surface 51 of the reactor chamber 24. The reactor chamber 24 will normally be substantially cylindrical and have a circular cross section and the flow of coolant liquid will preferably have a tangential component whereby the liquid flows in a helical path down the inside of the chamber 24 and functions to cool the walls 30 (30A and 30B) of the vessel or chamber 24 (which may be made of a suitable glass such as pyrex, i.e. may be a simple pyrex tube), as well as to contain the flame 28 and to pick up particulate, such as the small particles indicated at 92 that are carried down into the pool 34.

In some cases it may be desirable to use a chamber 24 having a rectangular cross section, in such a case the longitudinal axis of the chamber will normally be substantially vertical and the collecting fluid will flow substantially axially along the length of the chamber 24 from one end to the other. It may also be desirable to taper the chamber 24 from a larger cross sectional area at the inlet (one) end 48 to a smaller cross sectional area at the outlet end (other) end 34 e.g. a conical or pyramid shape.

Normally the cooling and collecting liquid will be a high boiling point petroleum base oil having a boiling point preferably above 100° C. and having a low viscosity. Other suitable type oils may be also be used.

As above described the cooling and collecting liquid is cooled by the cooling coil 58 and the indirect heat exchanger 44 and the particulate material 92 entrained in the liquid (oil) is filtered out in the filter 40. The cooled oil is recirculated via line 46 and reintroduced at the top 48 of the chamber 24 through the manifold 78.

The off gases are separated in the pool 34, pass into the chamber 36 and are exhausted via line 66.

EXAMPLE 1

Figures 4, 4A:
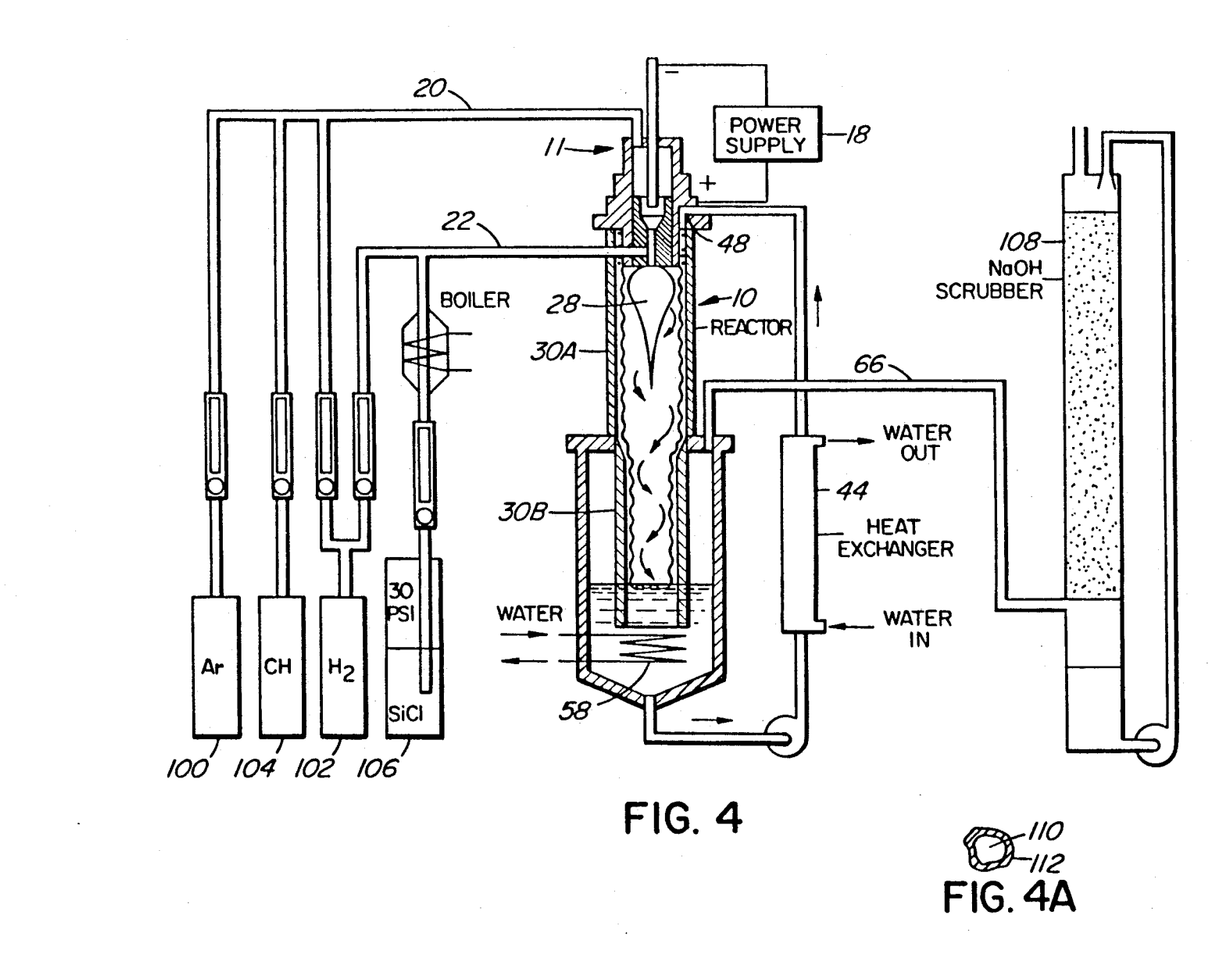
FIG. 4 is a view similar to FIG. 1 but showing a particular set-up for reacting silicon tetrachloride with methane to produce silicon carbide.
FIG. 4A is a schematic illustration of a ceramic or cermet powder particle of the present invention.

The system was configured as shown in FIG. 4 wherein the reactant was silicon tetrachloride ($SiCl_4$)

was introduced in a stream of hydrogen (H$_2$) through the line 22 i.e. injection passage 74. The plasma gas consisted of argon, methane and hydrogen. In this particular example both the anode and cathode were made of graphite to eliminate contamination of the carbide produced (normally the anode is made of cooper and the cathode of tungsten). The bottom end 32 of the chamber 24 was submerged below the level L of the pool 34.

The reacting chamber 24 and well 36 were first both evacuated to about 0.2 mm mercury and then backfilled with argon from the argon source 100.

Cooling water was applied to cool the plasma torch 11 and was also used to cool the oil in the coil 28 and in the heat exchanger 44.

The oil entered the top of the chamber 24 at a temperature of about 12° C. and was withdrawn at a temperature of about 17° C. and formed a film 50 about 2 mm thick over the surface of the wall of the chamber 24. The chamber 24 was 75 cm in diameter and had a longitudinal length of about 1 meter.

An arc was struck using pure argon and then hydrogen and methane from the sources 102 and 104 respectively were added to the plasma gas and the plasma flame 28 developed.

The silicon tetrachloride from the source 106 together with hydrogen as a mixture was then introduced into the plasma jet passage 26 by a line 22. The system was operated in this manner to generate a powder and the exhaust gases were removed from the system and carried via line 66 to a NaOH scrubber 108 to scrub the off gases before they were vented into atmosphere.

After the experiment was completed the silicon tetrachloride methane and hydrogen were shut off and the oil was transferred to a distillation flask and brought to a temperature of 100° C. under a vacuum for at least an hour while purging with a small flow of dry helium. The powders were then filtered from the oil and washed with hexane and then dried. The silicon carbide so produced is schematically illustrated in FIG. 4A. It should be noted that the particles 110 had and an outer coating 112 of residual oil.

The coating 112 tends to stop the particles 110 from agglomerating yet flashes off when the particles are used. This coating layer 112 when the particles are washed with hexane may contain small amounts of hexane.

The oil used was a high boiling point petroleum base oil having a boiling point of about 100° C.

Figure 6:
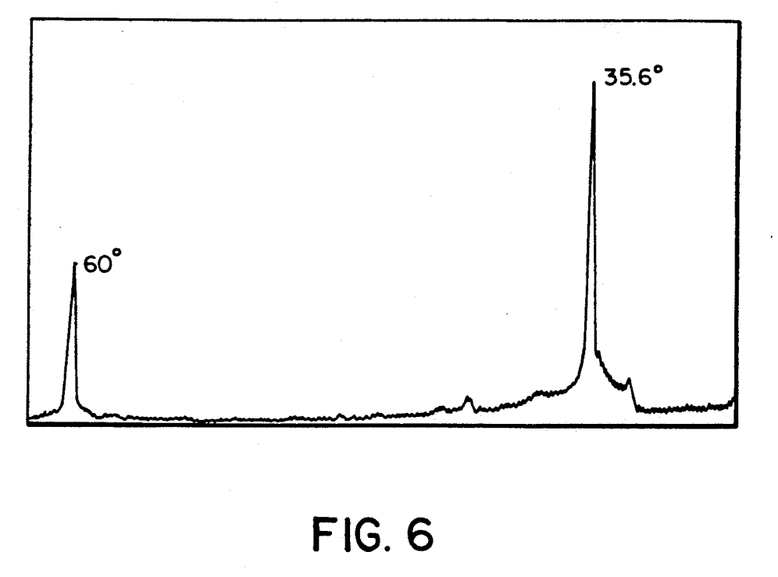
FIG. 6 is an x-ray diffraction pattern of silicon carbide powder produced after being washed with hexane and showing the purity of the silicon carbide particulate material produced and FIG. 7 is a graph showing particle size distribution by volume for a SiC powder.

The resultant product is analyzed by x-ray diffraction and found to be primarily beta (cubic) silicon carbide with small amounts (less than 5% by weight) of alpha (hexagonal) silicon carbide as shown in the x-ray diffraction plot of FIG. 6.

Figure 7:
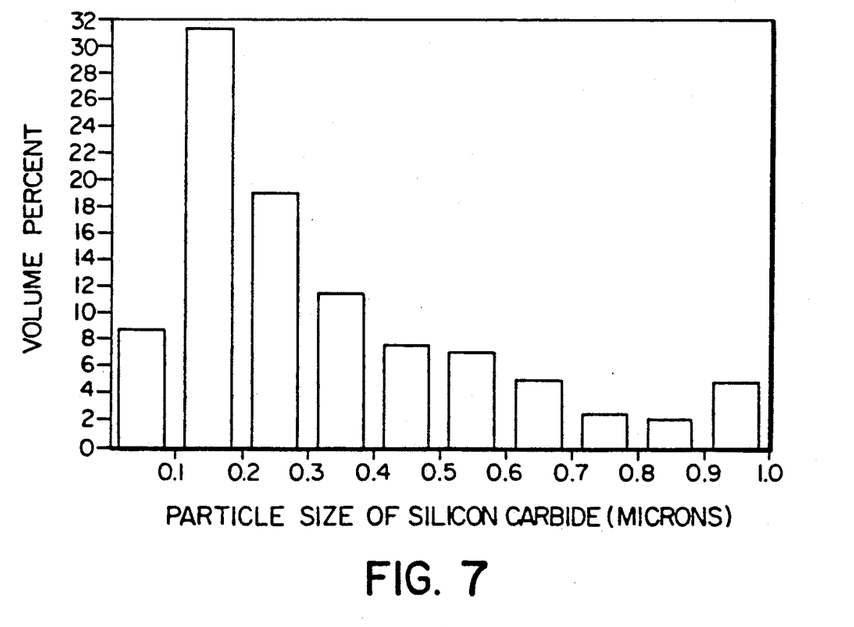
Figure 8:
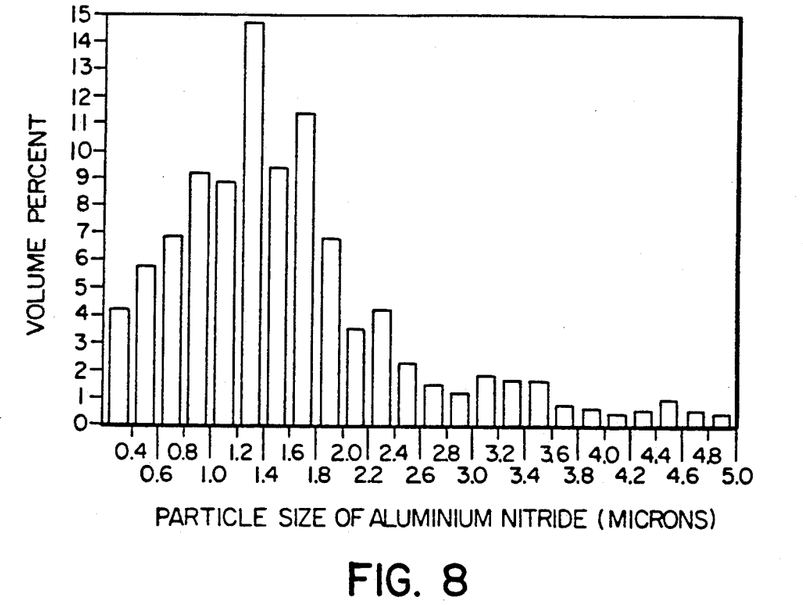
FIGS. 8 and 9 are graphs similar to FIG. 7 but showing the size distribution for aluminium nitride and tungsten carbide, respectively.

Particle size analysis was performed on a Horiba capa-700 particle size analyzer. The average particle size was 0.2 microns with a maximum particle size of approximately 0.6 microns illustrating that the distribution was relatively narrow and is shown in FIG. 7. The particles are random in shape.

The thin layers of oil absorbed on the powder amounted to about 3.0% and though it had a significantly lower boiling point it only completely evaporated from the surface of the particles upon heating to 350° C. indicating a molecular interaction between the oil and the SiC powder. Free carbon content of the powder ranged from 3 to 10% by weight.

EXAMPLE 2

Figure 5:
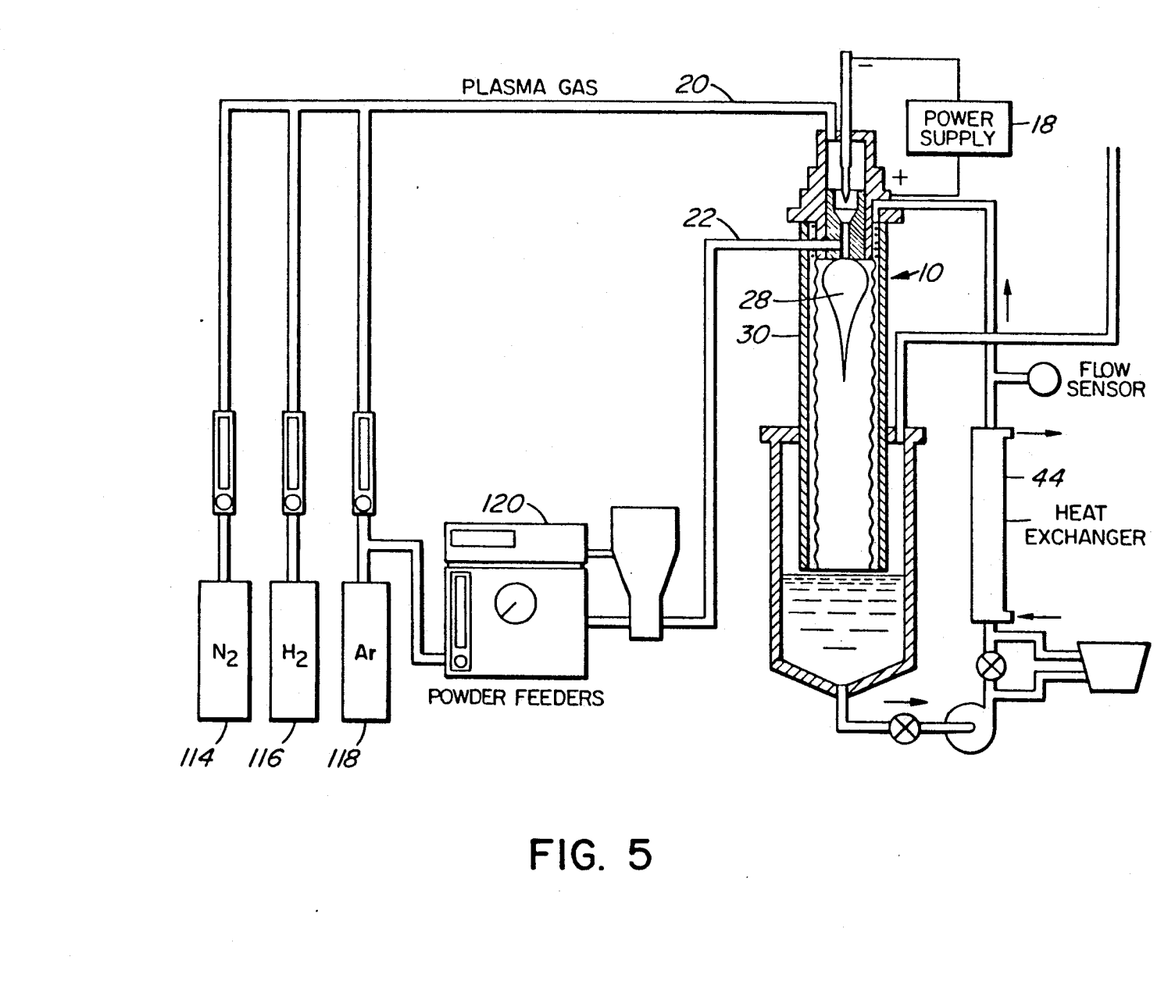
FIG. 5 is a view similar to FIG. 3 but incorporating a powder feeder to feed powder reactants into the system.

A similar test was carried out using the equipment illustrated in FIG. 5 which is essentially that as in FIG. 4 except the wall 30 of reaction chamber 24 is substantially cylindrical and has the same diameter throughout its length. The bottom end of the reaction chamber is above the level of the oil in the pool 34. In this case the heat exchanger 44 provided all of the cooling required for the oil being recirculated and the coil 58 described above was eliminated.

The procedure was essentially the same as described above for example with the arc being formed after evacuation of the system. In this case however, nitrogen, hydrogen and argon from the sources 114, 116 and 118 respectively were used as the plasma gas in line 20 and the reactant was aluminum powder carried in argon gas. The powder feed 120 used was Metco 4MP powder feed using a 4MP-800 flow meter.

There are difficulties in forming aluminium nitride as injected powder partially melts and vaporizes, but the degree of melting and vaporization depends on the amount of heat in the plasma jet, the powder feed rate, and the trajectory of the injected particles. Without sufficient heat only limited melting and vaporization will occur. A powder feed rate which is too high will give the same result. The trajectory of the particles must be such that they pass through the hottest regions of the plasma jet; this is difficult to achieve with radial injection.

Any aluminium which vaporizes nitrides fairly readily and forms sub-micron particles of AlN. Nitridation of the molten aluminium droplets is much more difficult. The thin oxide surface layer on the particles hinders the nitriding process. Even if this layer is reduced through the introduction of carbon to the plasma jet the nitride layer which forms on the surface of the particles acts as a barrier to the nitridation of the interior of the particles. In summary, the difficulty of injection 100% of the powder into the hottest part of the plasma jet along with the short residence times leads to incomplete vaporization of the aluminium powder. Therefore, even if this process has the potential for complete nitridation, one cannot expect to achieve optimum results with radial injection.

Preliminary trials have produced at least a portion of the powder as pure AlN having a particle size shown in FIG. 7. The maximum particle size was 5 μm, while 85% is smaller than 2.5 μm. The average particle size is 1.4 μm.

EXAMPLE 3

Due to the difficulties encountered in vaporizing aluminium and melting titanium carbide it has become obvious that it is even more difficult to produce tungsten carbide by injecting tungsten powder radially into a carburizing plasma. For this reason it was decided to adapt a conventional method of producing tungsten carbide to the plasma process. Commercially tungsten carbide is produced in tonnage quantities by dissolving tungsten and carbon in iron. When such a mixture is cooled tungsten carbide precipitates from solution. The iron matrix is dissolved in sulphuric acid, which leaves large crystals of WC behind which are then ground into powder. The same process may also be used to synthesize other carbides, such as titanium carbide and tantalum carbide.

A mixture consisting of 71.5 wt % high C-iron, 25 wt % tungsten, and 3.5 wt % carbon was dry milled to ensure thorough mixing. The iron and carbon particle size is −325 mesh (44 microns), while the tungsten powder had an average particle size of 2 microns). This composite powder was then pre-sintered at 850° C. for one hour to allow iron-tungsten-carbon agglomerates to form. The resulting compact was then broken up and sieved to −270 mesh (−53 microns).

This powder was then injected into an argon plasma. During the rapid heating process the tungsten and carbon dissolve in the iron. This is followed by rapid solidification which leads to a fine dispersion of tungsten carbide particulate in an iron matrix.

After plasma processing the powder was acid treated to remove the iron and any iron carbide which may have formed. X-ray analysis revealed the remaining powder to be a mixture of WC, $W_2C$, W, and C. The reaction was carried to completion by firing this mixture in argon at 1550° C. for one hour. The x-ray analysis of the fired powders showed residual amounts of C and $W_2C$ remain, indicating that a longer firing time is required to produce WC.

Figure 9:
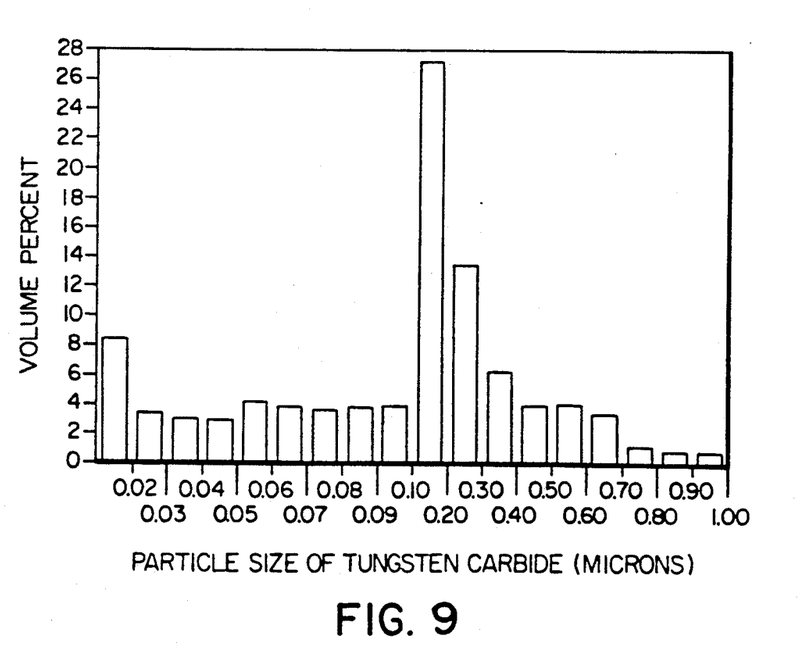

The particle size analysis of the resulting tungsten carbide is shown in FIG. 9. The maximum particle size was 1 micron, while the average size was 0.2 microns, which is a full order of magnitude smaller than that of the original tungsten powder. Further, 90% of the powder was below 0.5 microns. The size fraction below 0.1 microns, which accounts for 37% of the powder, had a fairly even distribution, with 8% below 0.02 microns.

It is believed that utilizing the technique of the present invention and either a gas reactant flow or a powder reactant flow, one should be able to produce AlN, TiN, TiC, $TiB_2$, $B_4C$, WC, TaC and SiC powders of the desired size and quite probably others.

The above description describes a plasma flame type thermal reactor for which the present invention is particularly suited, but as will be evident the collecting system could be used with other flame reactors by substituting a flame produced by other known techniques for the plasma flame described.

Having described the invention, modifications will be evident to those skilled in the art without departing from the spirit of the invention as defined in the appended claims.

We claim:

1. A method of forming and collecting sub micron sized ceramic or cermet powder material in a chamber having an inner wall surface comprising injecting a reactor flame and reactants into one end of said chamber, flowing a film of collecting liquid in hugging relationship with said inside surface to form an annular film of collecting liquid surrounding said flame flowing from said one end to an opposite end of said chamber and collecting said film in a pool of said collecting liquid at said opposite end, sealing said opposite end by a surface of said pool, collecting said particulate material formed in said chamber in said collecting liquid, continuously circulating said collecting liquid from said pool to said one end to form said annular film of collecting liquid passing in hugging relationship with said surface and separating said particulate material from said collecting liquid.

2. A method as defined in claim 1 wherein said flowing a film of collecting fluid in hugging relationship with said inside surface flows said film in a helical path along said surface.

3. A method as defined in claim 1 wherein said reactor flame is a plasma flame.

4. A method as defined in claim 1 wherein said chamber has its longitudinal axis substantially vertical and said one end is at the top end of said chamber.

5. A method as defined in claim 1 further comprising cooling said collecting liquid as it is circulated between said pool and said one end.

6. A method as defined in claim 2 wherein said reactor flame is a plasma flame.

7. A method as defined in claim 2 wherein said chamber has its longitudinal axis substantially vertical and said one end is at the top end of said chamber.

8. A method as defined in claim 2 further comprising cooling said collecting liquid as it is circulated between said pool and said one end.

9. A method as defined in claim 3 wherein said chamber has its longitudinal axis substantially vertical and said one end is at the top end of said chamber.

10. A method as defined in claim 3 further comprising cooling said collecting liquid as it is circulated between said pool and said one end.

11. A method as defined in claim 4 further comprising cooling said collecting liquid as it is circulated between said pool and said one end.

12. A method as defined in claim 6 wherein said reactor flame is a plasma flame.

13. A method as defined in claim 7 wherein said chamber has its longitudinal axis substantially vertical and said one end is at the top end of said chamber.

14. A method as defined in claim 8 further comprising cooling said collecting liquid as it is circulated between said pool and said one end.

* * * * *